(12) United States Patent
Chottiner et al.

(10) Patent No.: US 9,995,367 B2
(45) Date of Patent: Jun. 12, 2018

(54) PENDULUM ASSEMBLY FOR A CRANKSHAFT PENDULUM HAVING CAST-IN NEAR NET SHAPE HARDENED INSERTS

(71) Applicant: Ford Global Technologies, LLC, Dearborn, MI (US)

(72) Inventors: Jeffrey Eliot Chottiner, Farmington Hills, MI (US); Paul Edward Ostrander, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 14/808,610

(22) Filed: Jul. 24, 2015

(65) Prior Publication Data

US 2017/0023097 A1    Jan. 26, 2017

(51) Int. Cl.

| | |
|---|---|
| *B22C 9/10* | (2006.01) |
| *B22C 9/22* | (2006.01) |
| *B22D 19/00* | (2006.01) |
| *B22D 25/02* | (2006.01) |
| *F16F 15/28* | (2006.01) |
| *B22F 5/00* | (2006.01) |
| *C21D 9/00* | (2006.01) |

(52) U.S. Cl.
CPC ............ *F16F 15/283* (2013.01); *B22C 9/101* (2013.01); *B22C 9/108* (2013.01); *B22C 9/22* (2013.01); *B22D 19/00* (2013.01); *B22D 25/02* (2013.01); *B22F 5/007* (2013.01); *C21D 9/0062* (2013.01)

(58) Field of Classification Search
CPC ........ B22D 19/00; B22D 25/02; B22C 9/101; B22C 9/108; B22C 9/22
USPC .................................... 164/98, 112
See application file for complete search history.

(56) References Cited

U.S. PATENT DOCUMENTS

| | | | | |
|---|---|---|---|---|
| 4,739,679 | A * | 4/1988 | Berger et al. | F16F 15/145 74/574.3 |
| 6,845,807 | B1 * | 1/2005 | Baltz et al. | B22C 9/103 164/12 |
| 2004/0017956 | A1 * | 1/2004 | Nakamura | F02F 7/0053 384/433 |
| 2016/0084295 | A1 * | 3/2016 | Murrish et al. | B22C 9/103 74/603 |

* cited by examiner

*Primary Examiner* — Kevin P Kerns
(74) *Attorney, Agent, or Firm* — LeClairRyan

(57) ABSTRACT

A pendulum crankshaft for an internal combustion engine includes a pendulum crankshaft having pendulum crank rolling path inserts that are cast into the component during the casting process. The rolling path inserts are positioned in a mold prior to casting. By including the rolling path inserts in the component during the molding process, the need to press the rolling path insert into the component after the component is cast is thus avoided, thereby eliminating the resulting stresses that would otherwise result. Machining and subsequent heat treatment are unnecessary. The component can be one or both of the crankshaft pendulum and the pendulum carrier. The rolling path may be formed from a metal such as sintered powdered metal. The flowable material may be a metal such as iron. The resulting component is free of stress regions, such as on the carrier strap, that normally result from methods that involve press-fitting the rolling path insert into the component.

12 Claims, 4 Drawing Sheets

PENDULUM ASSEMBLY FOR A CRANKSHAFT PENDULUM HAVING CAST-IN NEAR NET SHAPE HARDENED INSERTS

TECHNICAL FIELD

The disclosed inventive concept relates generally to crankshaft pendulums for internal combustion engines. More particularly, the disclosed inventive concept relates to a crankshaft pendulum assembly for a crankshaft pendulum having cast-in near net shape hardened cycloid sleeve inserts that provide rolling pathways.

BACKGROUND OF THE INVENTION

Internal combustion engines having a relatively small number of cylinders provide automobile makers with an attractive solution to the need for improved fuel economy. In order to compensate for the reduction of cubic capacity, vehicle manufacturers developed technologies to improve engine power, such as direct fuel injection, turbocharging, and variable timing for inlet and exhaust camshafts. In this way, six- and eight-cylinder engines can be scaled down without losing available horsepower.

An undesirable consequence of engines having higher cylinder pressures or a smaller number of cylinders is that the engine order torsionals increase. This can cause gear rattle in the transmission and increase interior NVH such as steering wheel vibration.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent driveline and interior NVH. Such crankshaft-mounted pendulums function as vibration absorbers as they are tuned to address and thus cancel out vibrations generated by crankshaft rotation, thus smoothing torque output of the crankshafts. This approach is taken as well by designers of some airplane piston engines where the pendulums smooth output torque.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier.

The crankshaft pendulum is interconnected with the pendulum carrier by pendulum rolling pins. Each pendulum rolling pin rides on a rolling path formed in the pendulum and in the carrier. The cycloid shape is itself difficult and expensive to machine. Instead of machining the shape, one solution is to use a near net shape powder metal insert which is less expensive to produce. The insert is press-fitted into the ear of the pendulum carrier. However, the required press to fit the inserts into position results in unacceptably high stresses in the area adjacent to the insert. Therefore this concept is not a practical solution in an actual manufacturing environment. An alternative approach is to provide a fully machined pendulum made of forged steel yields at the rolling pin contact. However, this approach is also impractical as expensive heat treatment and subsequent hard machining is required.

Accordingly, a new approach to forming rolling path inserts for use in pendulum crankshaft assemblies is needed to address the problems associated with known arrangements.

SUMMARY OF THE INVENTION

The disclosed inventive concept overcomes the problems associated with known crankshaft pendulums for internal combustion engines by providing a crankshaft pendulum having cast-in near net shape hardened cycloid sleeves or inserts formed from a metal such as sintered powdered metal. The rolling path inserts are positioned in a mold prior to casting. By including the rolling path inserts in the component during the molding process, the need to press the rolling path insert into the component after the component is cast is thus avoided, thereby eliminating the resulting stresses that would otherwise result. The cast-in production approach of the disclosed inventive concept also avoids the need for machining and subsequent heat treatment required if the component is made from a material such as cast iron.

The advantages of the disclosed inventive concept over the prior art are achieved by producing a component for a crankshaft pendulum assembly by forming a mold for the component, forming a rolling path insert, positioning the rolling path insert into the mold, and injecting a flowable material into the mold to form the finished component.

The component can be one or both of the crankshaft pendulum and the pendulum carrier. The rolling path insert may be formed from a metal such as sintered powdered metal. The flowable material may be a metal such as iron. The resulting component is finished or substantially finished out of the mold and requires either no machining or minimal machining. The resulting component is free of stress regions, such as on the carrier strap, that normally result from methods that involve press-fitting the rolling path insert into the component. In addition, no heat treatment is required after the component is formed.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
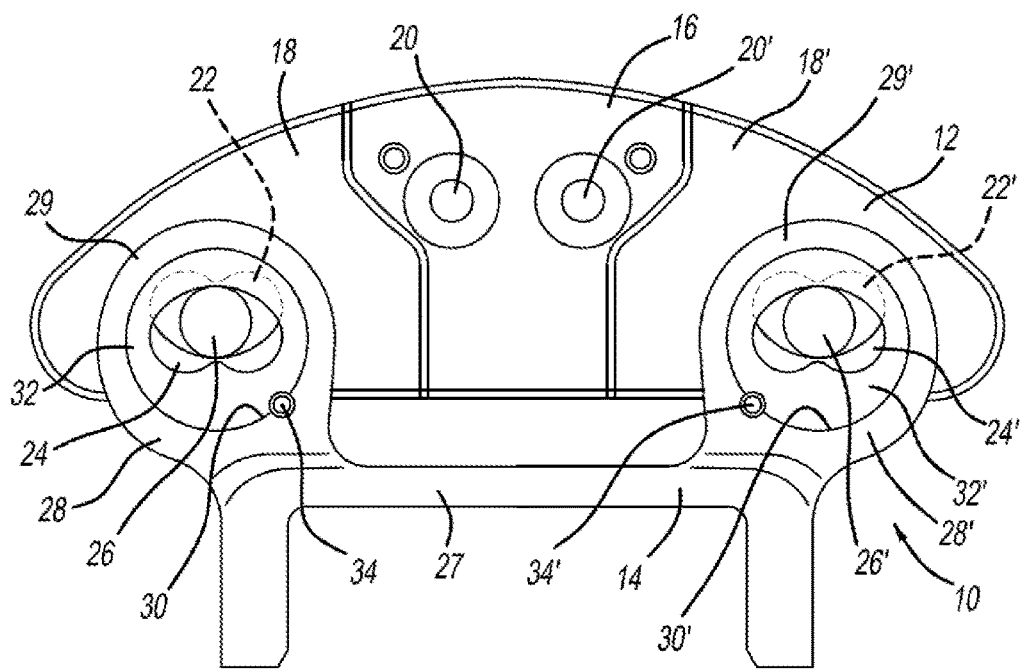
FIG. 1 is a front view of a pendulum carrier and one half of a crankshaft pendulum attached to the pendulum carrier in which the pendulum carrier includes rolling path inserts according to known technology.

In the following figures, the same reference numerals will be used to refer to the same components. In the following description, various operating parameters and components are described for different constructed embodiments. These specific parameters and components are included as examples and are not meant to be limiting.

Figure 2:
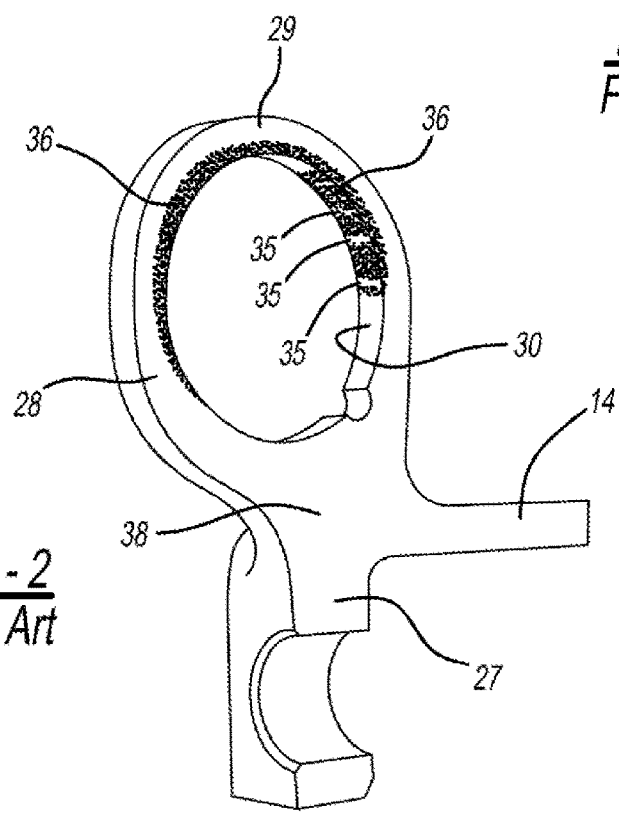
FIG. 2 is a perspective view of a portion of the pendulum carrier of known technology from which the insert has been removed to illustrate the stress in the area adjacent the insert hole that results from placement of the insert into the pendulum carrier ear.
Figure 3:
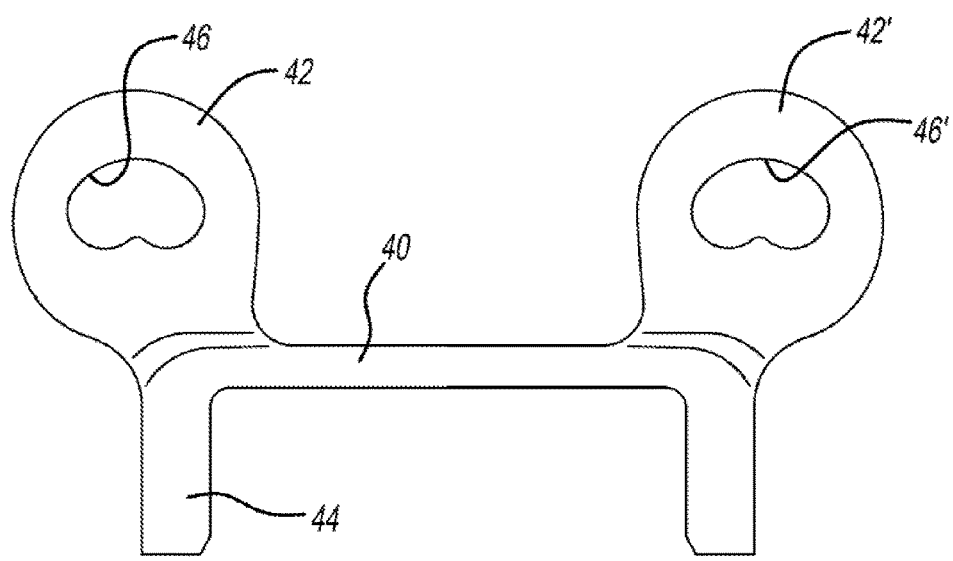
FIG. 3 is a front view of a cast iron pendulum carrier having machined rolling pathways according to known technology.
Figure 4:
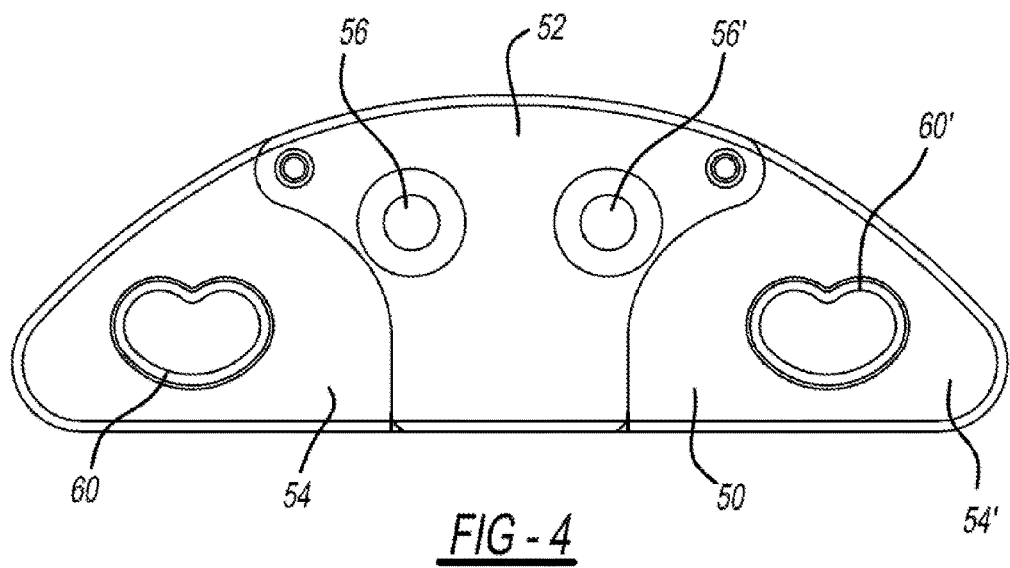
FIG. 4 is a front view of half of a crankshaft pendulum having cast-in near net shape hardened cycloid sleeve inserts according to the disclosed inventive concept.
Figure 5:
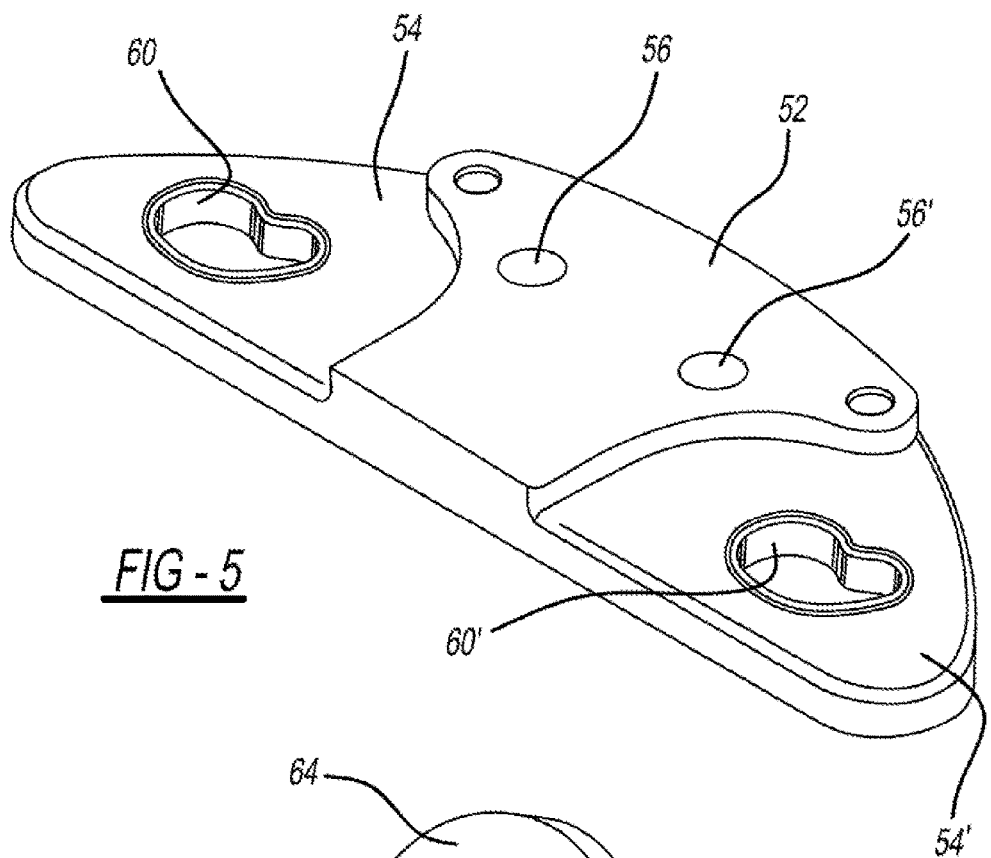
FIG. 5 shows a perspective view of the crankshaft pendulum half of FIG. 4.
Figure 6:
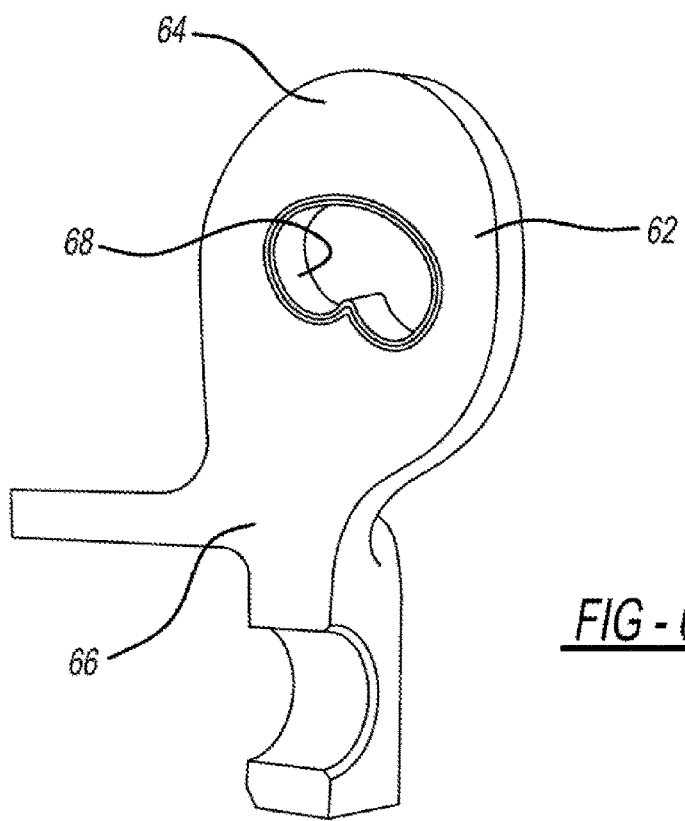
FIG. 6 is a perspective view of a portion of the pendulum carrier of the disclosed inventive concept illustrating the cast-in cycloid sleeve insert.

As illustrated in FIGS. 1 through 3, two different approaches to forming a rolling pathway in the parts of a crankshaft pendulum assembly according to known technology are illustrated. FIGS. 4 through 6 illustrate components of the crankshaft pendulum assembly according to the disclosed inventive concept in which cast-in cycloid sleeve inserts are provided.

Referring to FIG. 1, a front view of a crankshaft pendulum and pendulum carrier assembly according to known technology, generally illustrated as 10, is shown. The assembly 10 includes a crankshaft pendulum half 12 movably attached to a pendulum carrier 14. The pendulum carrier 14 is attached to an engine crankshaft (not shown). The crankshaft pendulum half 12 represents one-half of a whole crankshaft pendulum (not shown), the one-half being removed so that the pendulum carrier 14 can be illustrated in relation to the crankshaft pendulum half 12.

The crankshaft pendulum half 12 includes a centrally-formed raised area 16 and a pair of recessed areas 18 and 18' formed laterally of the centrally-formed raised area 16. A pair of fastener holes 20 and 20' are formed in the centrally-formed raised area 16 for fasteners (not shown) that are used to fix the two halves of the crankshaft pendulum together.

Each of the crankshaft pendulum half 12 and the pendulum carrier 14 have rolling pathways formed therein. Specifically, the crankshaft pendulum half 12 includes a first pendulum rolling pathway 22 and a second pendulum rolling pathway 22'. The pendulum carrier 14 includes a first pendulum carrier rolling pathway 24 and a second pendulum carrier rolling pathway 24'. A pendulum roller 26 is positioned within both the first pendulum rolling pathway 22 and the first pendulum carrier rolling pathway 24. A pendulum roller 26' is positioned within both the first pendulum rolling pathway 22' and the first pendulum carrier rolling pathway 24'. As illustrated in FIG. 1, the crankshaft pendulum half 12 is in its full out position relative to the pendulum carrier 14.

The pendulum carrier 14 includes a body 27 having carrier ears 28 and 28'. The carrier ear 28 includes a carrier strap 29 and the carrier ear 28' includes a carrier strap 29'. The body 27 is attached to the crankshaft (not shown).

The carrier ear 28 includes an insert hole 30 formed by the carrier strap 29 and the carrier ear 28' includes an insert hole 30' formed by the carrier strap 29'. A carrier insert 32 is press-fitted into the insert hole 30 of the carrier ear 28. A carrier insert 32' is press-fitted into the insert hole 30' of the carrier ear 28'. The press-fitted carrier inserts 32 and 32' may be made from a hardened metal, such as hardened powder metal or hardened steel. A pin 34 is provided to aid in the orientation of the pressed-in carrier insert 32 relative to the carrier ear 28 during assembly. In the same manner, a pin 34' is provided to aid in the orientation of the pressed-in carrier insert 32' relative to the carrier ear 28' during assembly.

According to known crankshaft pendulum construction, the pressed-in carrier insert is press-fitted into the pendulum carrier by a press suitable for such a purpose. Because the fit between the pressed-in carrier insert and the carrier ear is typically an interference fit, insertion of the carrier insert into the insert hole results in undesirable stress on the area of the carrier ear adjacent to the insert hole. This situation is illustrated in FIG. 2, in which a perspective view of a portion of the pendulum carrier 14 of FIG. 1 is shown. Particularly, the carrier ear 28 is shown without the pressed-in carrier insert in place to illustrate the stress created in the area adjacent the insert hole 30 after the carrier insert is installed.

Referring to FIG. 2, the installation of the carrier insert by press-fitting can generate a Von Mises stress in the carrier strap 29 of more than 3000 MPa. The distribution of Von Mises stress is illustrated in FIG. 2 in which the areas designated as 35 undergo the greatest level of stress of over 450 MPa, while the area designated as 36 undergo the second greatest level of stress of over 400 MPa. As illustrated, the greatest concentration of stress is in the thinnest area of the carrier strap 29, whereas the lowest level of stress is an area 38 that defines the neck connecting the carrier strap 29 to the body 27 of the pendulum carrier 14. The illustrated Von Mises stress on the carrier strap 29 that results upon insertion of the pressed-in carrier insert is an undesirable result of known assembly techniques.

In an effort to eliminate the stresses created in the carrier strap by known approaches, cycloids have been machined directly in cast iron pendulums and pendulum carriers. According to this approach, no insert is required, and thus stresses to the local environment are avoided. An example of a component of the crankshaft pendulum carrier assembly that is cast and machined is illustrated in FIG. 3 in which a front view of a cast pendulum carrier 40 is shown. The cast pendulum 40, typically made from cast iron, includes carrier ears 42 and 42' attached to a carrier body 44. A rolling path 46 is machined directly into the carrier ear 42 and a rolling path 46' is machined directly into the carrier ear 42'. Rolling pins (not shown) are movably fitted within the rolling paths 46 and 46'.

In operation, the rolling paths 46 and 46' of the cast pendulum carrier 40 yield at the rolling pin contact. To prevent this undesirable result, heat treatment of the cast iron component is required following machining. The step of heat treatment, added to the expense of machining, renders this approach to providing a solution to the problem of costly crankshaft pendulum assembly components impractical. But the added step of heat treatment may not provide satisfactory results, in that the cast iron (even austempered ductile iron [ADI], a heat treated cast iron) often experiences unacceptable wear. Thus a forged or stamped steel design that is hardened is required. However, the hardening process itself causes distortion in the steel and subsequent "hard" machining.

The disclosed inventive concept avoids inadequacies in methods and material by providing an alternative to known approaches to constructing a crankshaft pendulum assembly. Particularly, and referring to FIGS. 4 through 6, components of a crankshaft pendulum assembly incorporating cast-in cycloid sleeve inserts are illustrated.

FIG. 4 illustrates a front view of a portion of a crankshaft pendulum half 50 constructed according to the disclosed inventive concept. FIG. 5 illustrates a perspective view of the crankshaft pendulum half 50. Referring to both FIG. 4 and FIG. 5, the crankshaft pendulum half 50 is attached to a pendulum carrier (not shown) which is itself attached to the crankshaft. The crankshaft pendulum half 50 represents one-half of a whole crankshaft pendulum (not shown). The covering half is removed for purposes of illustration.

The crankshaft pendulum half 50 includes a centrally-formed raised area 52 and a pair of recessed areas 54 and 54' formed laterally of the centrally-formed raised area 52. A pair of fastener holes 56 and 56' are formed in the centrally-formed raised area 52 for fasteners (not shown) that are used to fix the two halves of the crankshaft pendulum together.

The crankshaft pendulum half 50 includes cast-in, near net shape hardened rolling path insert sleeves 60 and 60'. The rolling path insert sleeves 60 and 60' are preferably formed from a powdered or sintered metal, although other materials such as hardened steel may be suitable.

The crankshaft pendulum halves are not the only components of the crankshaft pendulum assembly that can be formed with rolling path insert sleeves. In addition or in the alternative, the pendulum carrier may also be formed with rolling path insert sleeves, as illustrated in FIG. 6. With reference to that figure, a perspective view of a portion of a pendulum carrier 62 is illustrated. The pendulum carrier 62 includes a pendulum carrier ear 64 that is attached to a pendulum carrier body 66. A cast-in, near net shape hardened rolling path insert sleeve 68 is provided. Like the rolling path insert sleeves 60 and 60', the rolling path insert sleeve 68 is preferably formed from sintered powdered metal, although other materials may be suitable.

Figure 7:
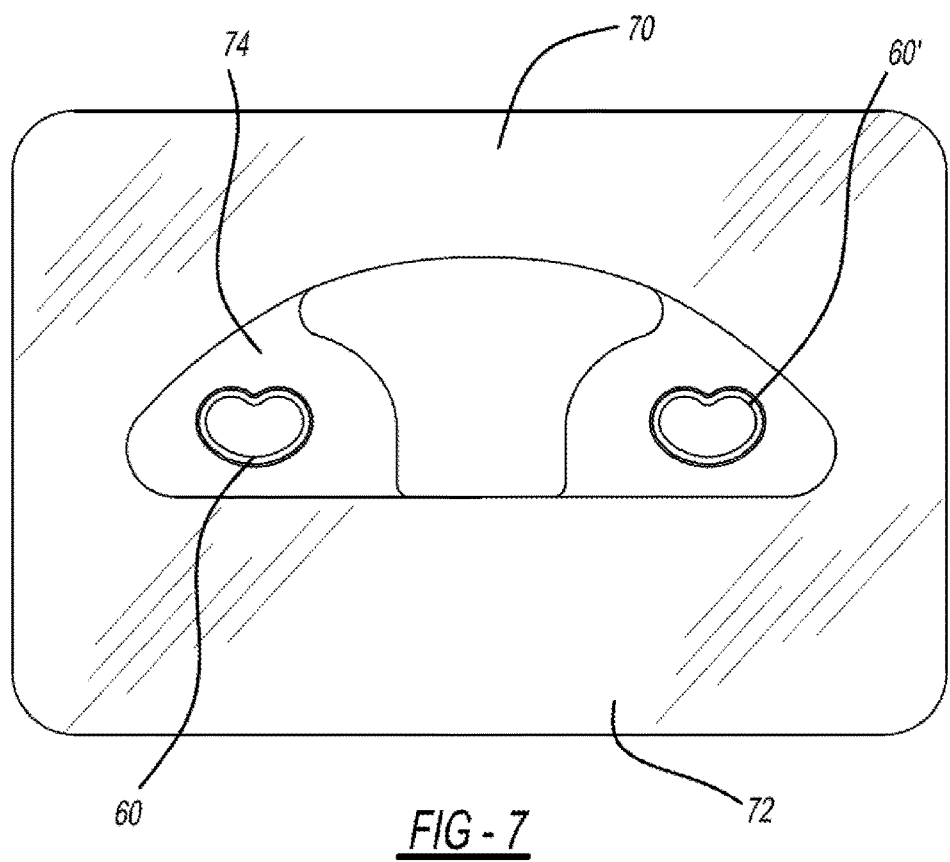
FIG. 7 is a plan view of a mold having a mold cavity in which a pair of hardened cycloid sleeve inserts have been placed prior to injection of the molten material.

To manufacture either the crankshaft pendulum or the pendulum carrier, the cycloid sleeves are first positioned within the appropriate mold. An example of the positions of the cycloid sleeves within a mold is shown in FIG. 7 in which a mold 70 for a crankshaft pendulum half is shown. The mold 70 includes a mold body 72 having a mold cavity 74 defined therein. Once formed, the rolling path insert sleeves 60 and 60' (or the rolling path insert sleeve 68 in the case of a pendulum carrier) are positioned within the mold 70 prior to injection. Once correctly positioned, the mold is closed and the flowable material, such as cast iron, is injected into the mold 70.

Use of the cast-in, near net shape hardened rolling path insert sleeve in either or both of the crankshaft pendulum and the pendulum carrier according to the disclosed inventive concept avoids the stresses caused by press fitting as is known to result from assembly based on known technology. In addition, use of the cast-in, near net shape hardened rolling path insert sleeve in either or both of the crankshaft pendulum and the pendulum carrier according to the disclosed inventive concept avoids the added cost associated with the need to machine and heat treat a cast metal part. The disclosed inventive concept provides the benefit of a hardened near net shape rolling path insert while eliminating the disadvantages attendant the known technologies.

In addition to providing the specified advantages over known approaches to forming a rolling path insert in crankshaft pendulum assemblies, one skilled in the art will readily recognize from such discussion, and from the accompanying drawings and claims that various changes, modifications and variations can be made therein without departing from the true spirit and fair scope of the invention as defined by the following claims.

What is claimed is:

1. A method of producing a crankshaft pendulum assembly for an internal combustion engine, the method comprising:
   forming a mold for a crankshaft pendulum assembly component, said component being selected from the group consisting of a pendulum carrier and a crankshaft pendulum;
   forming a rolling path insert;
   positioning said rolling path insert in said mold; and
   subsequently injecting flowable material into said mold to form said component.

2. The method of producing a crankshaft pendulum assembly of claim 1, wherein said rolling path insert is formed from a metal selected from the group consisting of sintered powdered metal and hardened steel.

3. The method of producing a crankshaft pendulum assembly claim 1, wherein said flowable material is a molten metal.

4. The method of producing a crankshaft pendulum assembly claim 1, wherein said flowable material is molten iron.

5. The method of producing a crankshaft pendulum assembly of claim 1, wherein each of said components includes a pair of said rolling path inserts.

6. A method of producing a crankshaft pendulum assembly for an internal combustion engine, the method comprising:
   forming a mold for a crankshaft pendulum assembly component;
   forming a rolling path insert;
   positioning said rolling path insert in said mold; and
   subsequently injecting flowable material into said mold to form said component.

7. The method of producing a crankshaft pendulum assembly of claim 6, wherein said crankshaft pendulum assembly component is a crankshaft pendulum.

8. The method of producing a crankshaft pendulum assembly of claim 6, wherein said crankshaft pendulum assembly component is a pendulum carrier.

9. The method of producing a crankshaft pendulum assembly of claim 6, wherein said rolling path insert is formed from a metal selected from the group consisting of sintered powdered metal and hardened steel.

10. The method of producing a crankshaft pendulum assembly claim 6, wherein said flowable material is a molten metal.

11. The method of producing a crankshaft pendulum assembly claim 6, wherein said flowable material is molten iron.

12. The method of producing a crankshaft pendulum assembly of claim 6, wherein each of said components includes a pair of said rolling path inserts.

* * * * *